United States Patent [19]
Austin

[11] 3,892,731

[45] July 1, 1975

[54] SOLVENTS FOR AND PURIFICATION OF CHITIN

[75] Inventor: Paul Rolland Austin, Wilmington, Del.

[73] Assignee: University of Delaware, Newark, Del.

[22] Filed: Nov. 23, 1973

[21] Appl. No.: 418,441

[52] U.S. Cl.......... 260/211 R; 260/209 R; 424/180; 252/357; 162/74
[51] Int. Cl.² ........................................... C07H 5/06
[58] Field of Search................ 260/211 R; 424/180

[56] References Cited
UNITED STATES PATENTS
3,089,821    5/1963    Folkers ........................... 260/211 R Primary Examiner—Johnnie R. Brown
Assistant Examiner—Cary B. Owens

[57] ABSTRACT

New solvents for chitin are described comprising a chloracetic acid alone or in combination with other solvents, and a method for purifying the chitin and regenerating it in the form of crystalline fibrils.

2 Claims, No Drawings

SOLVENTS FOR AND PURIFICATION OF CHITIN

Chitin is an aminocellulose derivative that occurs widely in nature, for example, in the cell walls of fungi, bovine cartilage, cuttlefish bone and the hard shell of insects and crustaceans. The waste from shrimp, lobster and crab seafood industries contains 10–15 percent chitin and is a potentially important source of chitin, although the isolation and purification of the chitin, associated therein with mineral components, protein and other ingredients, presents considerable difficulty.

The applications for chitin are not extensive, in part because it has been little investigated and in part because it is difficult to purify. The use of chitin for accelerating and promoting wound healing is described in U.S. Pat. No. 3,632,754, to L. L. Balassa, Jan. 4, 1972. In other literature, the difficulties of purification are mentioned frequently. Chitin is also employed in the manufacture of chitosan, a deacetylated chitin that is readily soluble in dilute acids and may find application in paper making and surface active agents, for example.

More specifically, chitin is a mucopolysaccharide, believed to be poly-N-acetyl-D-glucosamine, with an empirical formula of $(C_8H_{12}O_5N)_n$ in which n may be any number into the thousand range, but is commonly in the area of 100–1000. Chitin is a generally intractable material, soluble only is strong mineral acids, lithium thiocyanate solutions, and other special concentrated salt solutions, most of which cause disintegration or rapid degradation with loss in molecular weight or hydrolysis of the acetyl groups or both. In a communication in the Society of Dyers and Colorists Journal 74, 647–654 (1958) Giles et al. report that monochloracetic acid swells and hence is absorbed by chitin; however, a solution of chitin is neither disclosed nor suggested.

Accordingly it is an object of this invention to provide a method for preparing solutions of chitin that can be filtered, otherwise purified or processed.

Another object is to prepare solutions containing as much as 5–10% or more chitin at workable viscosity. A related aspect is to provide lower viscosity solutions in the normal 1–3% range of chitin concentration.

A further purpose of the invention is to provide a method for the regeneration of chitin in purified form. The purified chitin is itself an object of the invention.

Still another aspect of the invention is to provide a method for the preparation of chitin in the form of crystalline fibrils, such fibrils being themselves an object of the invention.

It has been found that the di- and tri-chloracetic acids as a group are particularly useful for dissolving chitin; they do so rapidly, usually at room temperature or with mild heat. They give relatively low viscosity solutions and they cause only slow degredation of the chitin. They are especially useful in conjunction with other solvents such as formic acid.

Of the two chloracetic acids, trichloracetic acid is preferred because of the ready solubility of chitin in it. Since trichloracetic acid is a solid, it is frequently advantageous to use it in conjunction with formic acid and/or other solvents. Solutions containing 20–50% of trichloracetic acid in formic acid are particularly useful.

Dichloracetic acid is itself a liquid and accordingly is a convenient solvent, but it dissolves a lower amount of chitin and its chitin solutions become quite viscous at relatively low concentrations of chitin.

The solubility of chitin in the di- or tri-chloracetic acids is surprising, as there are no fucntional groups common to the two molecules. Even the order of solubility is curious. Trichloracetic acid, with a bulky trichloromethyl group is much the best solvent. Tricloracetic acid is the strongest of the three acids, of course, but with mineral acids, fairly concentrated solutions are required to dissolve chitin; with dilution the chitin precipitates, even though the acid becomes stronger (more highly ionized).

Although chitin is degraded slowly in the di- or trichloracetic acid systems, the solutions are more stable than might be expected. Solutions can be prepared at room temperature and are normally processed promptly, but even after a month they still have substantial viscosity and chitin is readily precipitated on dilution with water or other non-solvent.

It should be understood that when one speaks of solubility and solutions of chitin that, as with other high molecular weight polymers, it is meant to include dispersions that are largely clear and transparent to the naked eye, even though they are far from simple systems such as salt or sugar in water. However, these solutions or dispersions can be centrifuged or filtered readily, for example, through acid-resistant wool felts, glass wool or sintered glass.

In the regeneration of the chitin, a solution in a di- or tri-chloracetic acid or a mixed solvent containing the chloracetic acid is precipitated with aqueous alkali, by dilution with water or with another nonsolvent, such as acetone, 2-propanol or tetrahydrofuran. It is especially convenient to use aqueous ammonia or sodium hydroxide solutions for neutralization and precipitation because the chitin is more stable as a slurry in dulute alkalies than it is in acid systems and can be held at such a stage for a considerable period without degredation. Furthermore, the alkali regeneration carried out with vigorous stirring appears to favor formation of the crystalline fibrils.

From these procedures it is customary to obtain chitin in both powdery and fibril form. They may be separated readily by appropriate sieves. If the fibrils are the preferred product, the powdery chitin may be redissolved and processed through the last stages to obtain a further quantity of fibrils.

The following examples illustrate, but in no way limit, the practice of this invention.

EXAMPLE 1

Two parts of commercial chitin and 25 parts of a 41% mixture of trichloracetic acid in formic acid were shaken together at room temperature for two hours, by which time a very viscous solution of the chitin was formed. As a matter of convenience, this solution was diluted with another 25 parts of the trichloracetic acid-formic acid mixture. Shaking was continued for an additional 1.5 hours to dissolve a few remaining larger particles of chitin.

One-fourth of the above solution was then filtered through wool felt and a clear, somewhat colored, syrupy solution containing about 4% of of chitin was obtained. It was added, with stirring, to 55 parts of 2-propanol. The chitin precipitated was a gelatinous, rubbery mass. It was comminuted in the solvent and then filtered through filter paper and a spongy white mass of chitin was obtained. It was slurried again in fresh 2-propanol and filtered, and this washing-filtration process repeated for a total of four times, at which point the pH of the wash solvent was about 6.0. The material was dried thoroughly in air and 0.3 parts of purified, finely divided chitin containing some fibrilar type was obtained, a recovery of 60% of the chitin used in this part of the process.

A similar aliquot of the filtered, parent chitin solution was poured and stirred into 200 parts of water and the process of filteringreslurring in solvent was repeated successively with aqueous ammonia, 2-propanol/water azetrope (twice), 2-propanol, tetrahydrofuran and finally with acetone. The product comprised a powdery form of chitin and a wealth of chitin fibrils.

EXAMPLE 2

A mixture of 15 parts of dichloracetic acid and 1 part of chitin was allowed to stand at room temperature; most of the smaller particles dissolved readily and the solution increased markedly in viscosity. In order to dissolve the larger particles modest heating of the mixture was required. On dilution with formic acid the system was compatible at first but at a solvent ratio of 1:1, some gel particles were formed.

EXAMPLE 3

As illustrated in Example 2, the solution of chitin in mixed solvent may be approached by dilution of a preformed solution with a second or third solvent as well as from native chitin. In some cases dissolution is simpler because the chitin is already finely dispersed or because the initial solution causes a disordering of the highly ordered chitin molecules.

Thus, to an approximately 5% solution of chitin in trichloracetic acid-formic acid mixture there was added the following solvents, all of which were compatable to some degree and exemplify third components of ternary solvent systems that may be employed with chitin; glycollic acid, methylene chloride, concentrated aqueous urea and nitromethane.

EXAMPLE 4

One part of chitin was added to 20 parts of trichloracetic acid and 5 parts of acetic acid, the chitin swelled and dissolved with an increase in viscosity of the solution. After standing at room temperature for two days, the chitin could be precipitated by addition of saturated sodium sulfate solution.

While particular examples of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:
1. A solution of chitin in di- or tri-chloracetic acid.
2. Regenerated crystalline fibrillar chitin.

* * * * *